United States Patent [19]

Sampson, IV

[11] Patent Number: 5,044,649

[45] Date of Patent: Sep. 3, 1991

[54] BICYCLE DRIVE TRAIN CLEANING SHIELD

[76] Inventor: James Sampson, IV, 39 Powell Rd., Tabernacle, N.J. 08088

[21] Appl. No.: 572,778

[22] Filed: Aug. 27, 1990

[51] Int. Cl.$^5$ ............................................. B62J 13/00
[52] U.S. Cl. .................................. 280/288.4; 118/504; 118/505
[58] Field of Search ..................... 280/288.4; 118/504, 118/505

[56] References Cited

U.S. PATENT DOCUMENTS

| | | | |
|---|---|---|---|
| 2,212,166 | 8/1940 | Nelson | 118/505 |
| 2,227,453 | 1/1941 | Koch | 118/505 |
| 4,792,191 | 12/1988 | Farmer | 118/505 |

Primary Examiner—Mitchell J. Hill

[57] ABSTRACT

A foldable adjustable cleaning shield for use while maintaining the drive mechanisms of a bicycle, designed to fit between the rear wheel and its sprockets in a plane parallel to said wheel protecting the wheel and tire while exposing the drive chain, sprockets, chain wheels, and deraileur mechanisms for cleaning and lubrication. A fold at floor level helps to hold the shield in place and also provides a surface to catch dirt and dripping liquids.

14 Claims, 6 Drawing Sheets

BICYCLE DRIVE TRAIN CLEANING SHIELD

BACKGROUND OF THE INVENTION

1. Field of the Invention

This invention relates in general to bicycle drive train maintenance and in particular to cleaning and lubricating chains, chain wheels, sprockets and derailer mechanisms efficiently while in place on the bicycle.

2. Prior Art

The design of most bicycles is such that their chains, chain wheels, sprockets and derailer mechanisms are exposed to dust, dirt, and grime in normal use; to assure proper operation and long service life, they should be cleaned and lubricated regularly. The most efficient way to accomplish this goal is to remove the chain from the bicycle, brush or wipe the sprockets, chain wheels and deraileurs clean, lubricate the deraileurs, clean, lubricate and reinstall the chain. This is a dirty procedure which may require special tools and considerable time to complete and is rarely performed by most bicycle owners. Attempts to clean and lubricate these components while in place usually result in poor lubrication, and dirt and lubricant on the wheel, tire and adjacent floor area. In order to provide background information so that the invention may be completely understood and appreciated in its proper context, reference is made to a number of prior art patents as follows:

U.S. Pat. No. 3,931,991 to Marchello discloses a combination reservoir/shield which is hung on the frame while the rear wheel is held off the ground by a stand. The rigid tray does not allow for adjustment to different size bicycles; no provision is made for brushing off dirt, and the user is left with a container of dirty solvent which must be disposed of.

U.S. Pat. No. 4,578,120 to Chiarella discloses a reservoir device with fixed brushes which may be hand held or attached to the derailleur mechanism of a bicycle. This device makes no provision for cleaning the sprockets and chain wheels, nor for cleaning and lubricating the derailleur mechanisms; it too leaves the user with a reservoir of dirty solvent which must be disposed of.

U.S. Pat. No. 4,593,923 to Thalmann discloses a similar reservoir device which is hand held, but in which the brushes rotate. No provision is made for cleaning the sprockets and chain wheels, nor for cleaning and lubricating the derailleur mechanisms; and the user is again left with a reservoir of dirty solvent which must be disposed of.

U.S. Pat. No. 4,783,186 to Manning, discloses an attachment for the top of an aerosol lubricant can which includes brushes to clean the chain while lubricant is being applied. No provision is made for cleaning the sprockets and chain wheels nor for cleaning and lubricating the derailleur mechanisms. There is no provision for protection of the wheel, tire, or work area, and it can only be used with an aerosol lubricant container designed to accept it.

U.S. Pat. No. 4,891,037 to Maples discloses a split cylinder device containing lubricant, which remains on the chain while in use. This device applies lubricant continuously without regard to need; again no provision is made for cleaning the sprockets and chain wheels, nor for cleaning and lubricating the derailleur mechanisms.

Whatever the precise merits, features and advantages of the above cited references, none of them achieves or fulfills the purpose of the present invention.

SUMMARY OF THE INVENTION

The principal object of the present invention is to provide a bicycle cleaning shield which allows for faster and more efficient cleaning and lubrication of a bicycle chain, chain wheels, sprockets, and derailleur mechanisms without removing them from the bicycle. A further object of this invention is to provide a bicycle cleaning shield which maintains the cleanliness of the rear wheel, tire, and surrounding floor area. In addition, it is an object of this invention to provide a bicycle cleaning shield which is adjustable to various size bicycles. Another object of this invention is to provide a bicycle cleaning shield which is easy to wipe clean. A further object of this invention is to provide a bicycle cleaning shield which can be folded for shipping or storage. Another object of this invention is to provide a bicycle cleaning shield which is inexpensive and easy to use.

The foregoing objects can be accomplished by a shield fabricated from substantially rigid non-absorbent sheet material having a plurality of planar rectangular elements, which fits between the rear wheel and its sprocket(s), in a plane parallel to said wheel, protecting the wheel and tire, while extending outward at the floor to protect the surrounding area. The planar rectangular elements are joined to each other along indented parallel vertically oriented lines which allow it to be folded for storage or shipping, and opened out for use. A horizontal fold line below an axle slot facilitates insertion of same behind the sprockets, and indented parallel horizontally oriented fold lines on the lower portion, printed parallel vertically oriented cut lines and a printed horizontal cut line on the foreward portion provide for adjustment to various size bicycles.

BRIEF DESCRIPTION OF DRAWINGS

The attached drawings are referred to in the description of the invention, wherin.

DESCRIPTION OF INVENTION

Figure 1:
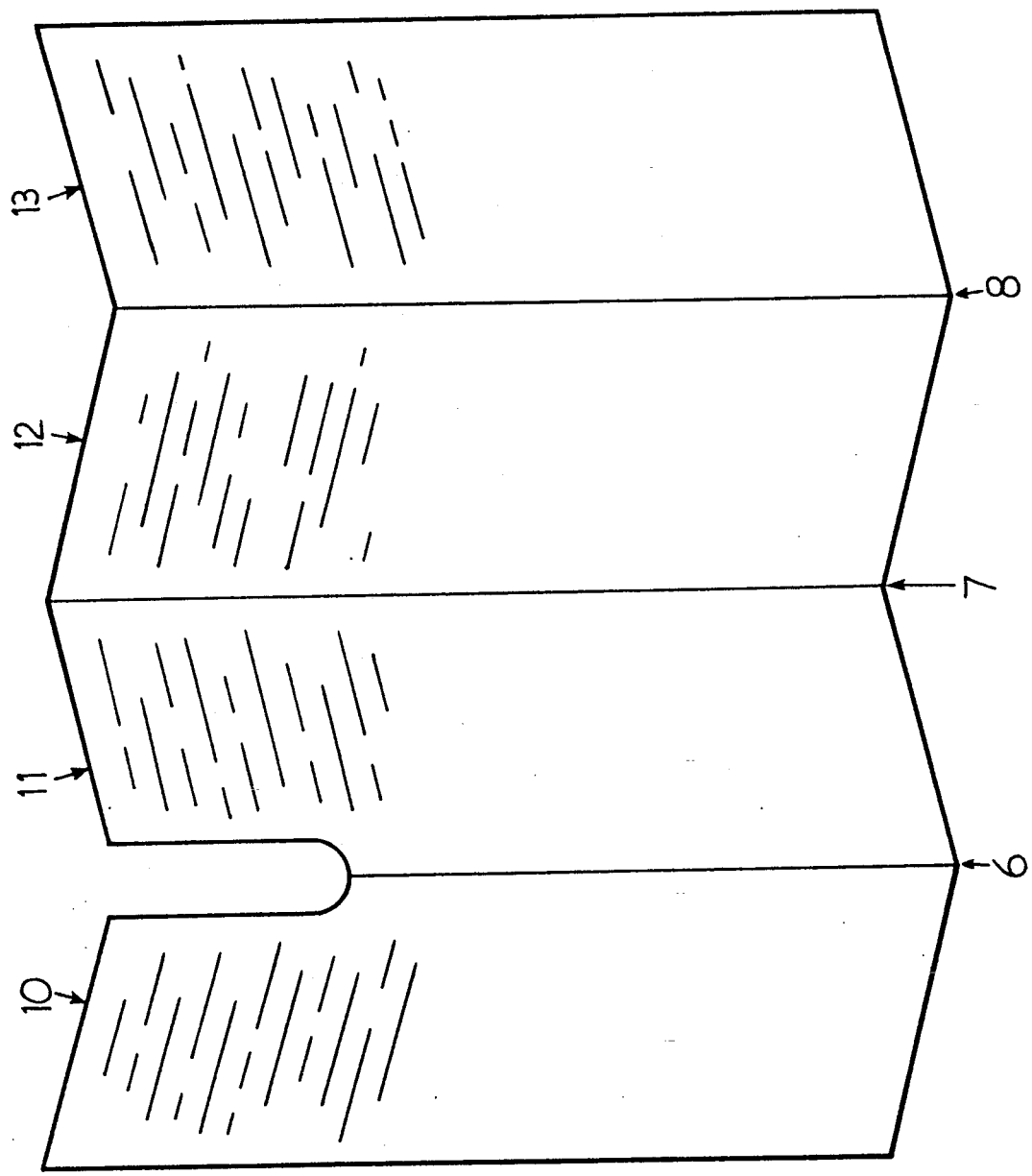
FIG. 1 is a perspective view of the basic form of bicycle cleaning shield in an a partially unfolded position.
Figure 2:
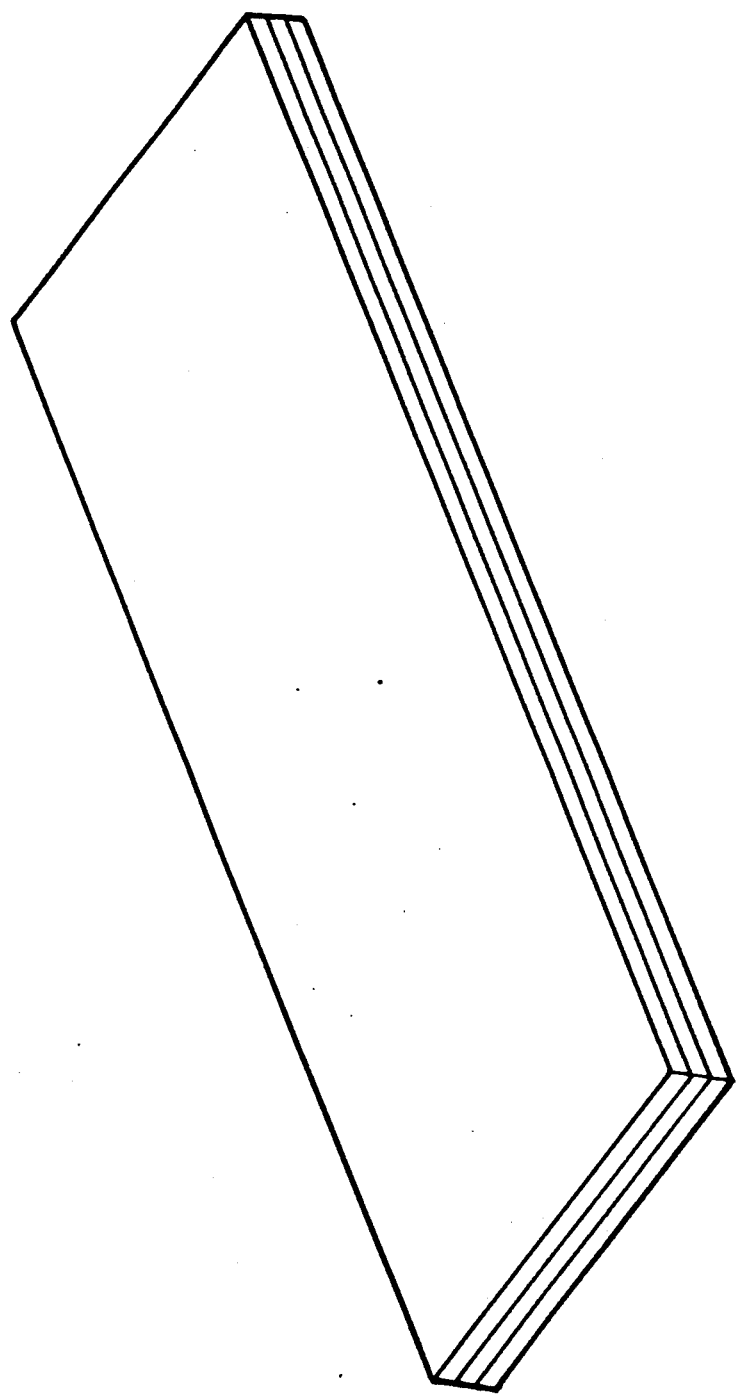
FIG. 2 is a perspective view of that same bicycle cleaning shield in its folded position.
Figure 3:
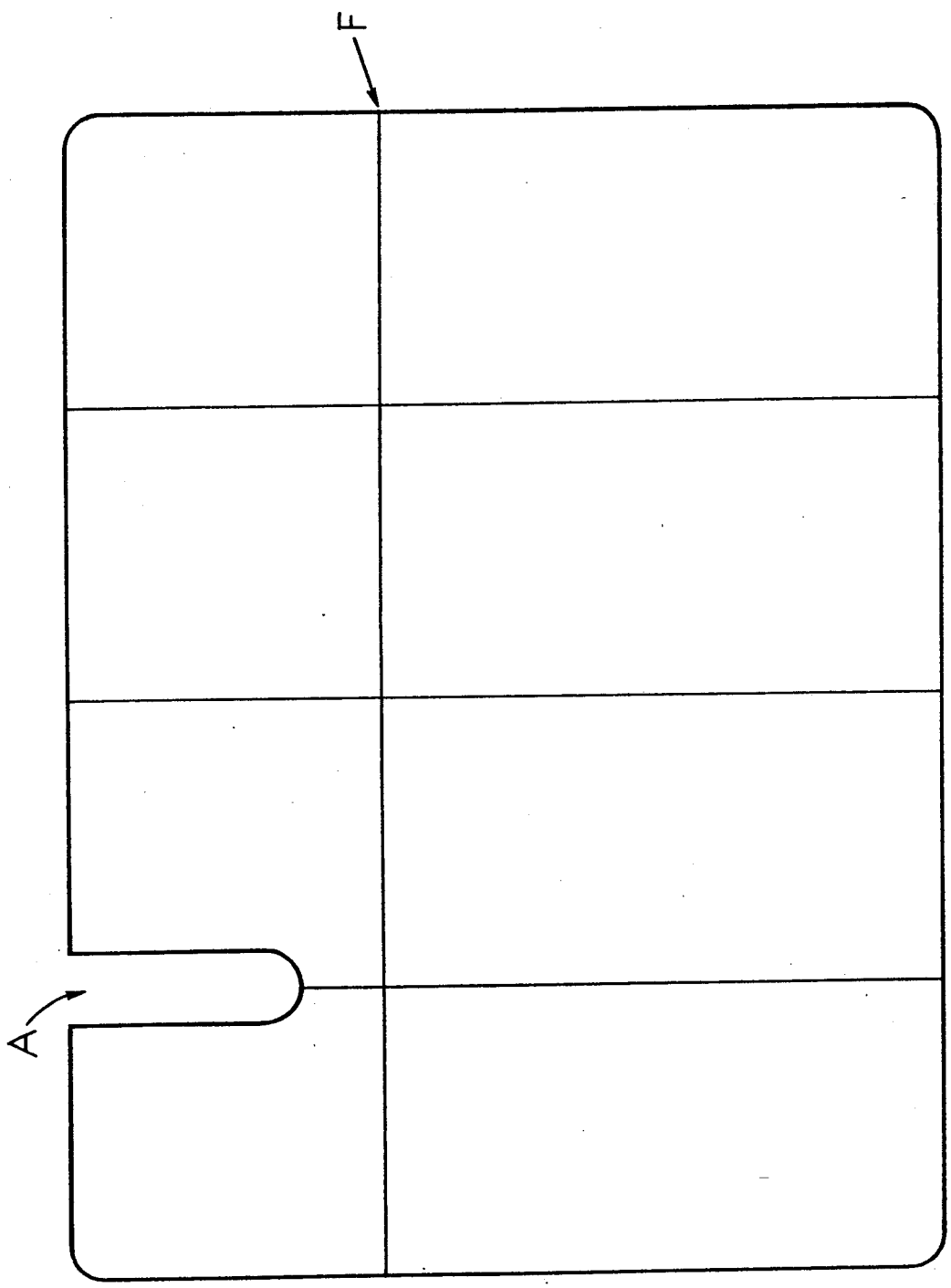
FIG. 3 is a side view of that same bicycle cleaning shield in a flat position, showing only factory installed folds.
Figure 4:
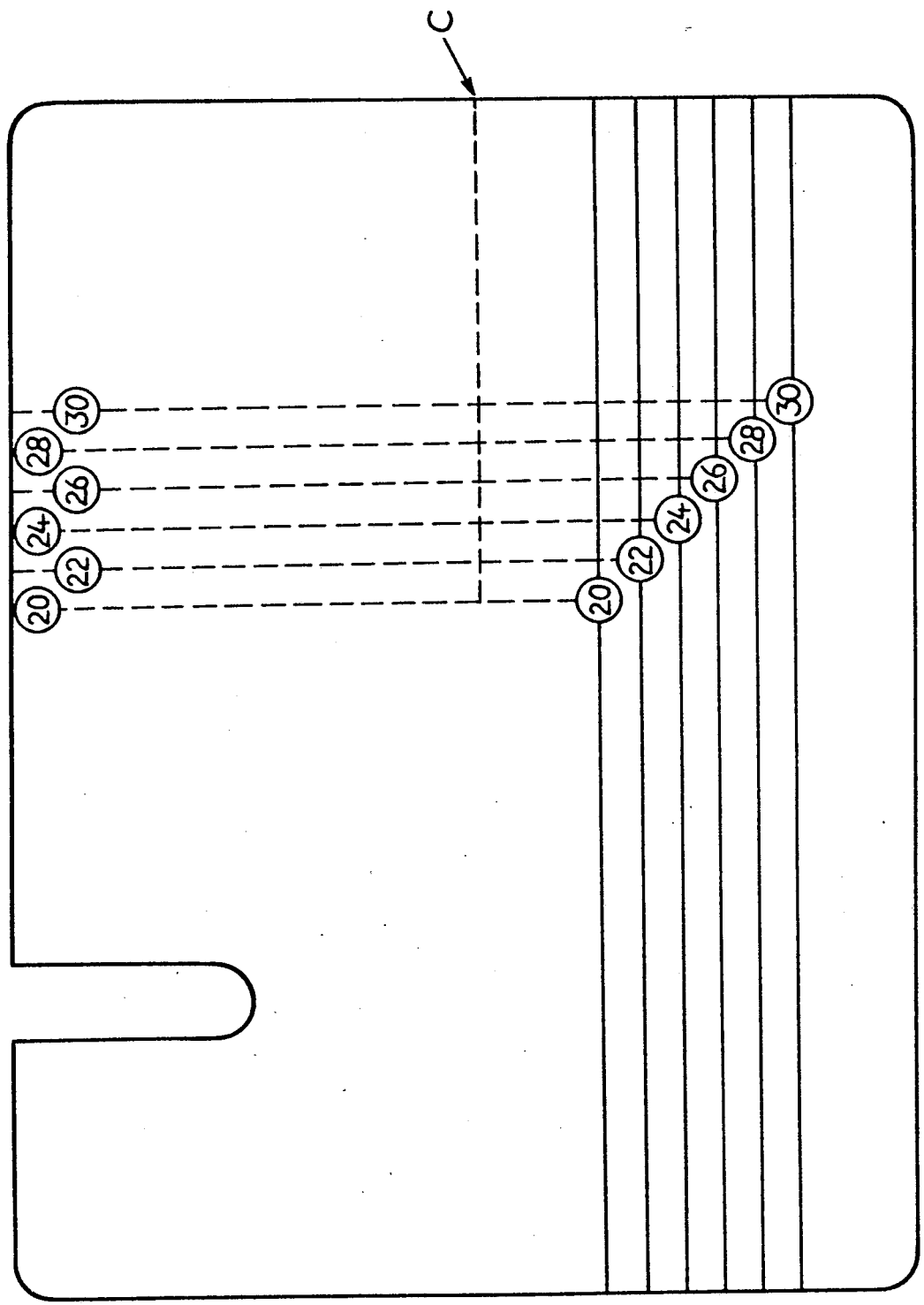
FIG. 4 is a side view of that same bicycle cleaning shield in a flat position, showing only printed cut lines and provisions for user installed folds.
Figure 5:
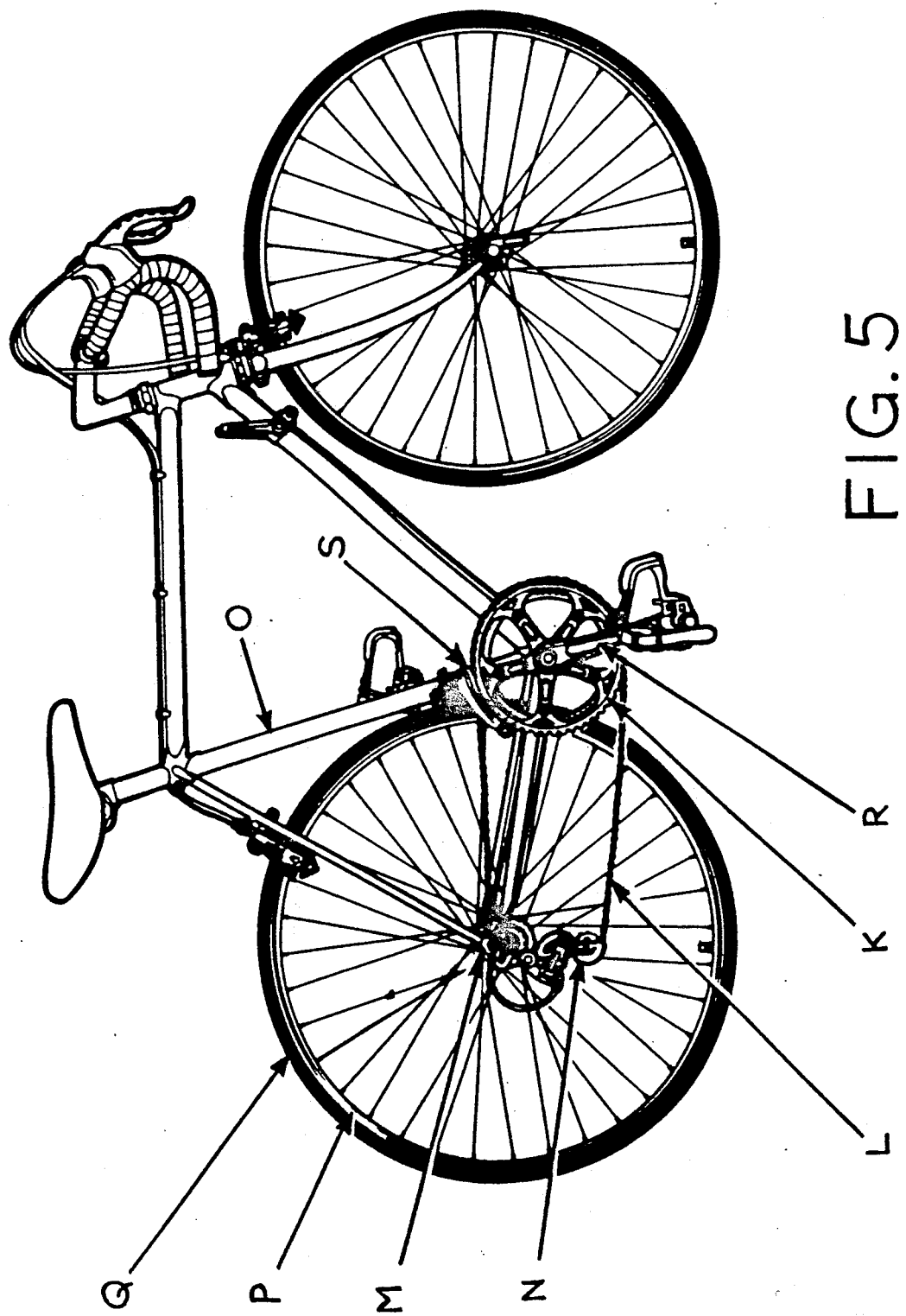
FIG. 5 is a side view of a multi-speed derailer equipped bicycle.
Figure 6:
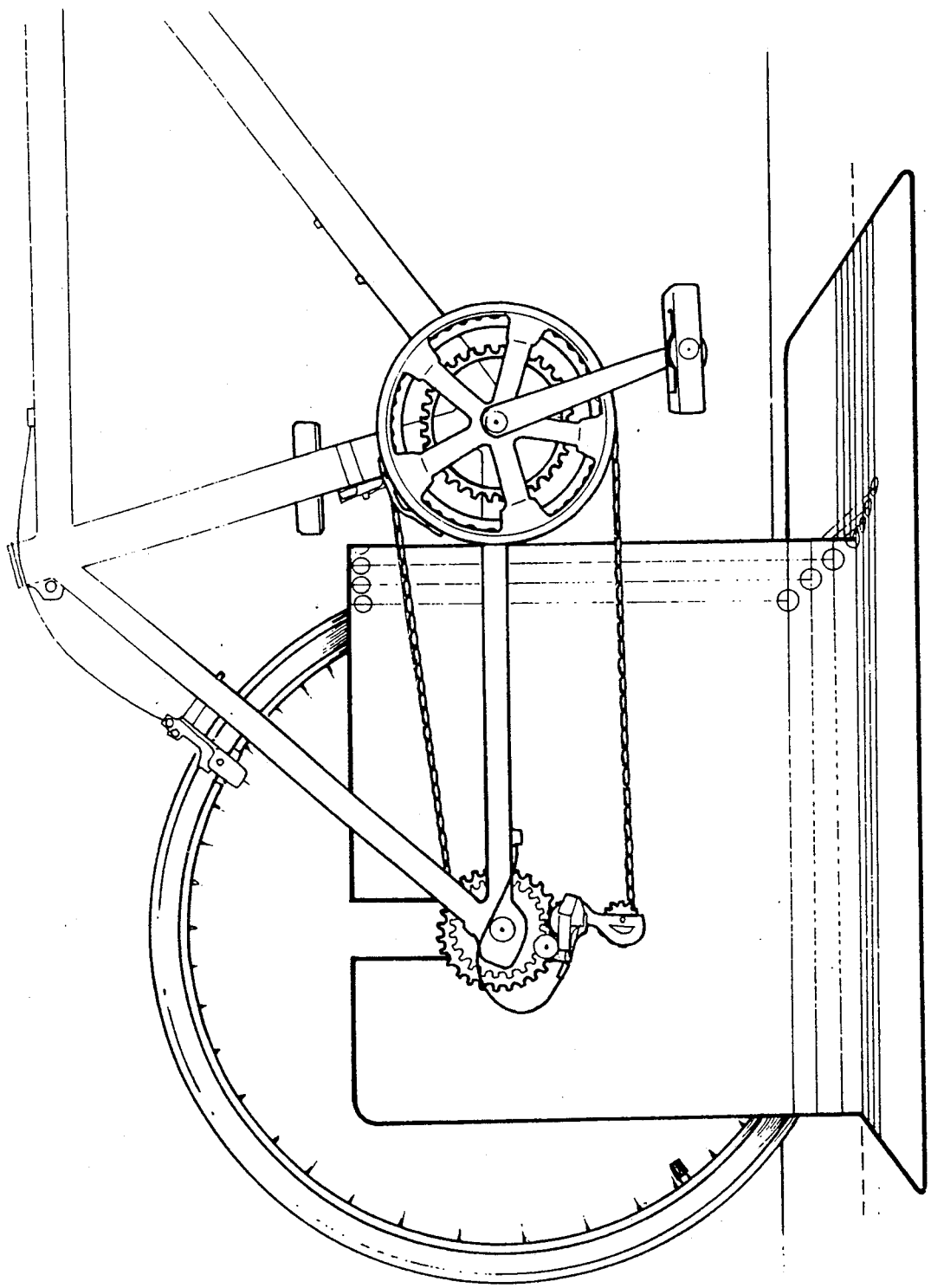
FIG. 6 is a view of the bicycle cleaning shield in place on a multi-speed derailer equipped bicycle.

For purposes of clarity, no single drawing shows all features of the invention, each feature is shown at least once in FIG. 1 thru FIG. 4 inclusive, which in their entirety illustrate a preferred embodiment of the invention. FIG. 1 shows a blank of non-absorbent corrugated material processed to form thereon a plurality of vertically oriented indentations constituting folds, as shown by folds 6, 7 and 8 which are equally spaced and parallel to each other, thereby forming a plurality of elements as shown by elements 10, 11, 12 and 13. The folds are so performed that fold 6 tends to turn element 10 relative to element 11 in a clockwise direction, whereas fold 7 tends to turn element 11 relative to element 12 in a counter-clockwise direction, and so forth. The result is that the bicycle cleaning shield may be folded together like the bellows of an accordion to form a quadratic prism package as shown in FIG. 2. An axle cutout in the rearward upper edge (A), and a horizontal fold line (F) are shown in FIG. 3. A plurality of horizontally oriented parallel indentations or fold lines along the lower portion (shown as 20, 22, 24, 26, 28 and 30), used in conjunction with a plurality of vertically oriented parallel cutting guide lines on the foreward portion (also shown as 20, 22, 24, 26, 28 and 30) plus a horizontally oriented printed cut line (C) on the foreward portion are used to adjust the bicycle cleaning shield to various size bicycles and are shown in FIG. 4. FIG. 5 shows a multi-speed deraileur equipped bicycle which is comprised in part of chain wheels (K), a chain (L), sprockets (M), deraileur mechanisms (N) and (S), a frame (O), a wheel (P), a tire (Q), and a pedal crank (R). FIG. 6 shows the cleaning shield in place on a multi-speed deraileur equipped bicycle.

Before being used, the shield would be fitted to the bicycle according to the following directions: 1. Determine the diameter of the rear tire (marked on the sidewall, for example 26 × 1⅜ means 26 inches diameter and 1⅜ inches width). 2. Locating a series of circles printed on the upper edge of the shield, select the number that matches your tire diameter. Cut from the upper edge through the diameter number, down the line, stopping at a second circle containing the same number. 3. Fold the shield horizontally on the numbered line matching your tire diameter (the line where you stopped cutting in step 2), by raising the upper edge to a vertical position. 4. Cut from the forward edge rearward along the cut line "C" to intersect your first cut; the upper forward corner of the shield is thus removed and set aside. 5. While bending the shield at horizontal line F, slide the axle slot up between the sprockets (M) and the rear wheel (P); the horizontal fold line you made will be in contact with the floor, the lower forward portion of the shield will lay flat under the chain wheels (K), and the shield will be held in place by the sprockets and contact with the floor. The sprockets, deraileurs, chain wheels and the rear portion of the chain will be exposed for cleaning and lubrication while the wheel, tire and surrounding floor are protected from dirt and lubricant. The user would now clean and lubricate the exposed parts as follows While the pedal crank is rotated backward, a brush (an old tooth brush works fine) is held against one surface of the chain for several full revolutions, this procedure is repeated on all four surfaces of the chain. The brush is then used to clean the sprockets, chain wheels and rear deraileur mechanism gears as they are turned by the moving chain. While still rotating the pedal crank, the user would apply a light weight lubricant to the chain at the rear deraileur mechanism. The front deraileur mechanism is brushed and lubricated in a similar manner; the chain, sprockets, chain wheels, frame and deraileur mechanisms wiped clean and the shield removed. The shield would be wiped clean and folded for storage and the bicycle would be ready for use.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. In a bicycle, the improvement comprising in combination:
   a drive system comprising a chain, deraileur mechanisms, chain wheels and sprockets;
   a cleaning shield fabricated from substantially rigid non-absorbent sheet material, with means for releasably retaining same between the rear wheel and its sprockets in a plane parallel to said wheel, protecting the wheel and tire while allowing access to the chain, chain wheels, sprockets, and deraileur mechanisms for cleaning and lubrication.

2. A bicycle as claimed in claim 1, wherein:
   said means for releasably retaining the cleaning shield include an axle slot which allows the cleaning shield to be inserted between the rear wheel of the bicycle and its rear wheel sprockets.

3. In a bicycle, the improvement comprising in combination:
   a drive system comprising a chain, deraileur mechanisms, chain wheels and sprockets;
   a cleaning shield with means for adjustment to various size bicycles, fabricated from substantially rigid non-absorbent sheet material, with means for releasably retaining same between the rear wheel and its sprockets in a plane parallel to said wheel, protecting the wheel and tire while allowing access to the chain, chain wheels, sprockets, and deraileur mechanisms for cleaning and lubrication.

4. A bicycle as claimed in claim 3, wherein:
   said means for releasably retaining the cleaning shield include an axle slot which allows the cleaning shield to be inserted between the rear wheel of the bicycle and its rear wheel sprockets.

5. A bicycle as claimed in claim 3, wherein:
   said means for adjusting the cleaning shield are comprised of a plurality of horizontally oriented parallel indentations or fold lines along the lower portion, a plurality of vertically oriented parallel printed cutting guide lines and a horizontally oriented printed cut line on the forward portion.

6. A bicycle as claimed in claim 3, wherein:
   said means for releasably retaining the cleaning shield include a user installed fold, parallel to and in contact with the surface supporting the bicycle.

7. A bicycle as claimed in claim 3, wherein:
   said user installed fold causes the lower portion of said shield to extend at a right angle to the plane of said wheel, parallel to and in contact with the surface supporting the bicycle, providing an area to catch dirt and dripping liquids.

8. In a bicycle, the improvement comprising in combination:
   a drive system comprising a chain, deraileur mechanisms, chain wheels and sprockets;
   a cleaning shield with means for adjustment to various size bicycles and means for folding for storage, having a plurality of planar rectangular elements fabricated from substantially rigid non-absorbent sheet material and joined to each other along longitudinal edges thereof, with means for releasably retaining same between the rear wheel and its sprockets in a plane parallel to said wheel, protecting the wheel and tire while allowing access to the chain, chain wheels, sprockets and deraileur mechanisms for cleaning and lubrication.

9. A bicycle as claimed in claim 8, wherein:
said means for releasably retaining the cleaning shield include an axle slot which allows the cleaning shield to be inserted between the rear wheel of the bicycle and its rear wheel sprockets.

10. A bicycle as claimed in claim 8 wherein:
said means for adjusting the cleaning shield are comprised of a plurality of horizontally oriented parallel indentations or fold lines along the lower portion, a plurality of vertically oriented parallel printed cutting guide lines and a horizontally oriented printed cut line on the foreward portion.

11. A bicycle as claimed in claim 8, wherein:
said means for releasably retaining the cleaning shield include a user installed fold, parallel to and in contact with the surface supporting the bicycle.

12. A bicycle as claimed in claim 8, wherein:
said user installed fold causes the lower portion of said shield to extend at a right angle to the plane of said wheel, parallel to and in contact with the surface supporting the bicycle, providing an area to catch dirt and dripping liquids.

13. A bicycle as claimed in claim 8, wherein:
said cleaning shield has folds along said longitudinal edges, alternate of said folds biasing planar rectangular elements of said cleaning shield in a clockwise direction relative to adjacent planar rectangular elements, and the remaining folds biasing planar rectangular elements in a counter-clockwise direction relative to adjacent planar rectangular elements.

14. A foldable adjustable cleaning shield for chain driven bicycles, comprising in combination.
a plurality of planar rectangular elements fabricated from substantially rigid non-absorbent sheet material having a plurality of folds dividing said sheet material into said planar rectangular elements joined to each other through said folds along the longitudinal edges thereof, alternate of said folds biasing planar rectangular elements in a clockwise direction relative to adjacent planar rectangular elements, and the remaining folds biasing planar rectangular elements in a counter-clockwise direction relative to adjacent planar rectangular elements alternate along longitudinal edges thereof, with an axle slot for inserting same between the rear wheel and its sprockets in a plane parallel to said wheel, a plurality of horizontally oriented parallel indentations or fold lines along the lower portion, a plurality of vertically oriented parallel printed cutting guide lines and a horizontally oriented printed cut line on the forward portion to permit said cleaning shield to be adjusted to various size bicycles and provide a horizontal surface to catch dirt and dripping liquids.

* * * * *